F. W. MEYER.
SYSTEM OF ELECTRICAL TRANSMISSION AND DISTRIBUTION.
APPLICATION FILED MAR. 29, 1918.
1,364,129.
Patented Jan. 4, 1921.
4 SHEETS—SHEET 1.
Fig. 1.
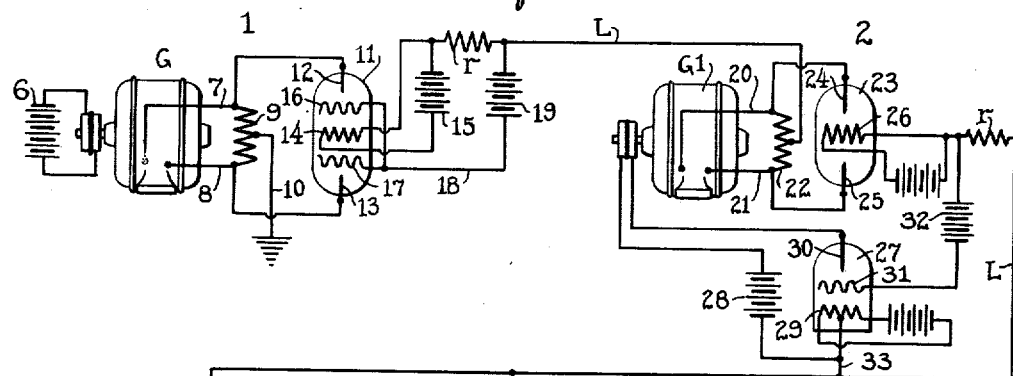
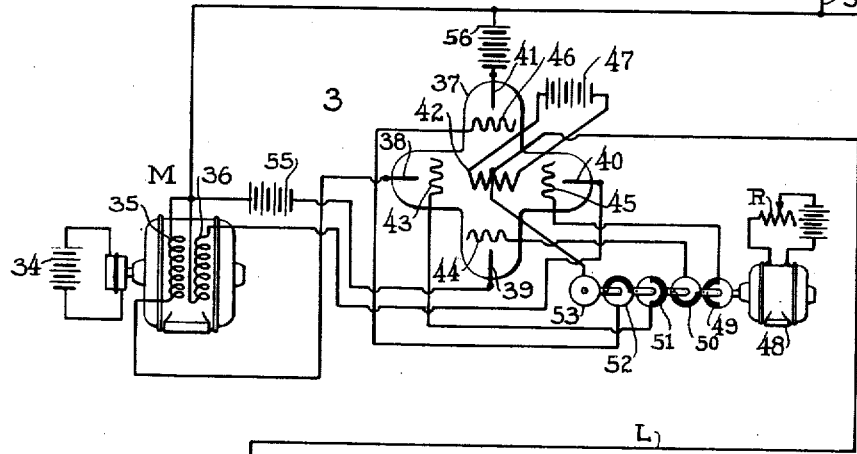
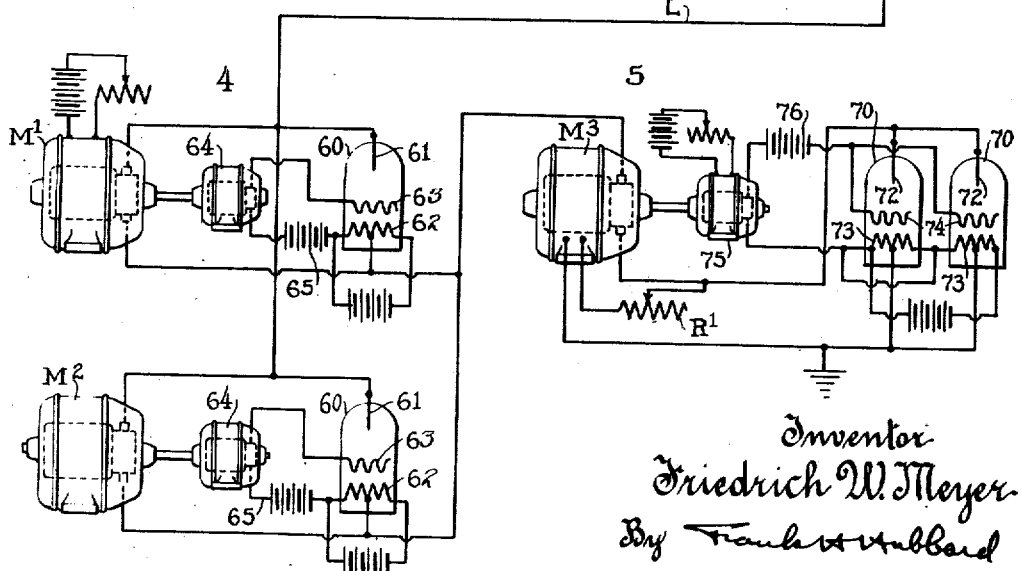
Inventor
Friedrich W. Meyer.
By Frank A. Hubbard
Attorney

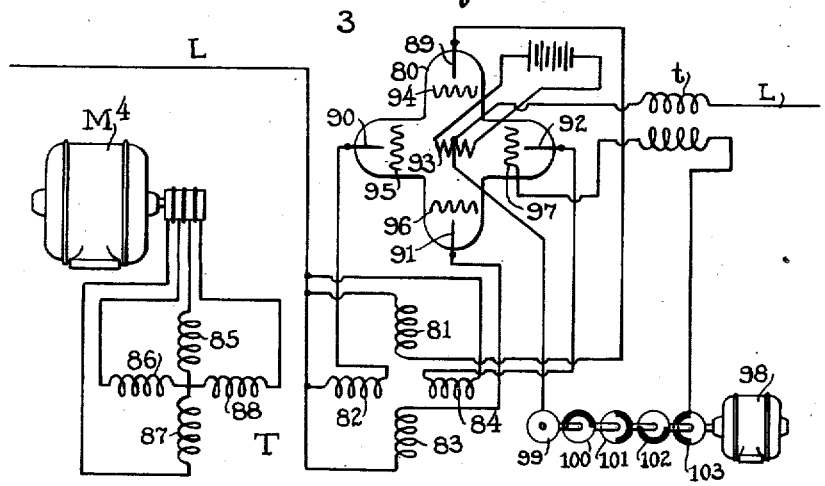
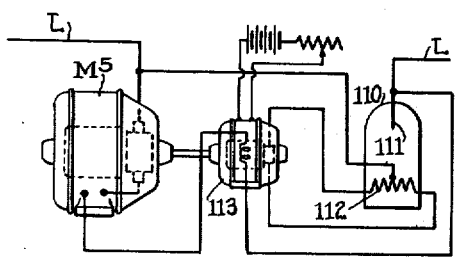
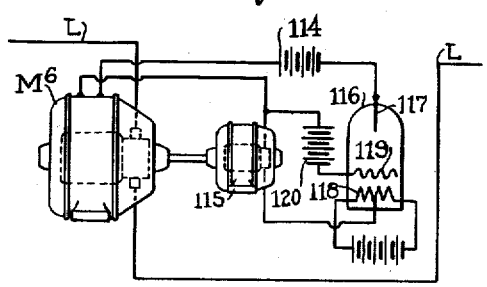

F. W. MEYER.
SYSTEM OF ELECTRICAL TRANSMISSION AND DISTRIBUTION.
APPLICATION FILED MAR. 29, 1918.

1,364,129.

Patented Jan. 4, 1921.
4 SHEETS—SHEET 3.

Inventor
Friedrich W. Meyer
By Frank V. Hubbard
Attorney

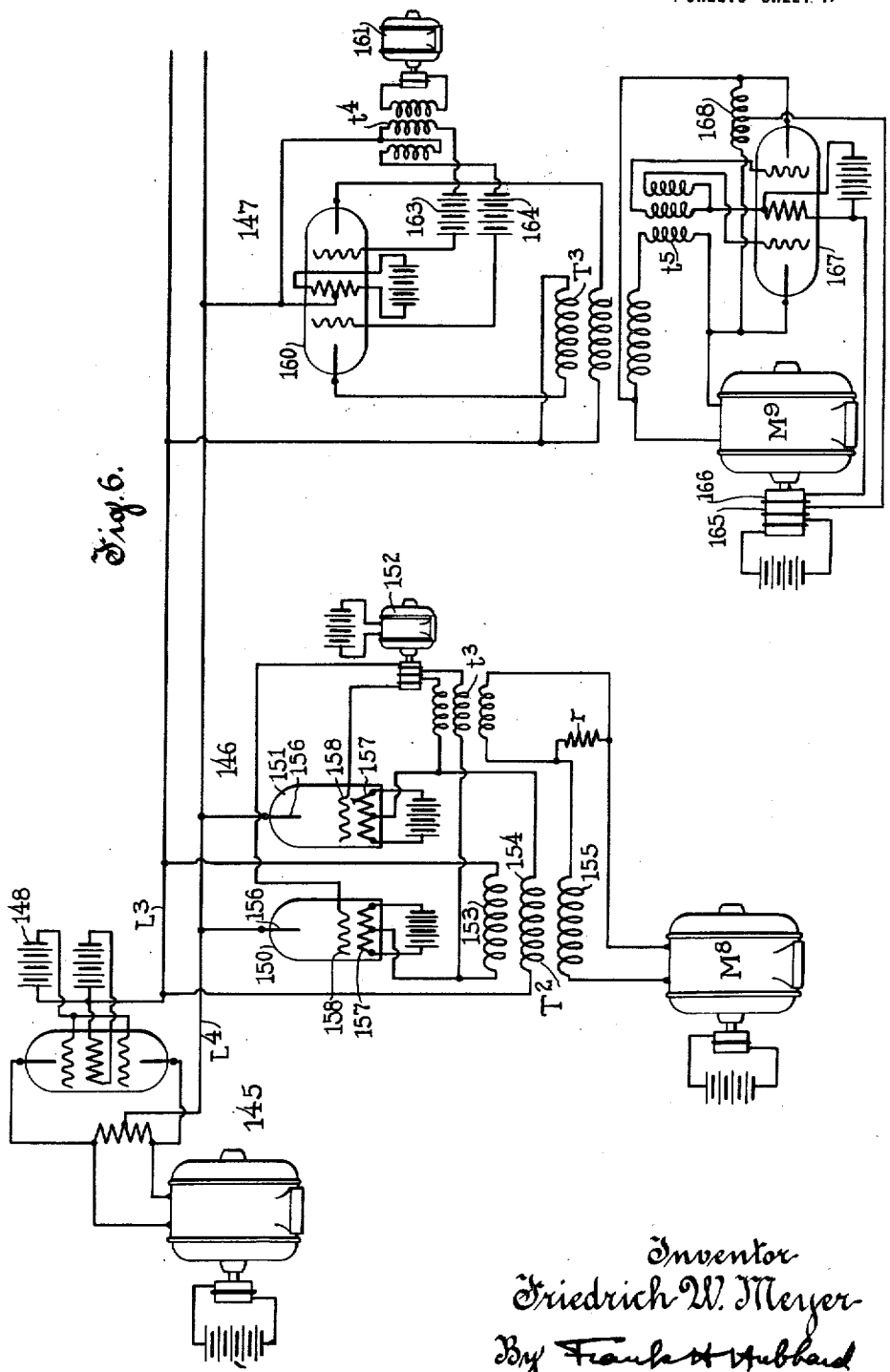

UNITED STATES PATENT OFFICE.

FRIEDRICH W. MEYER, OF MILWAUKEE, WISCONSIN, ASSIGNOR TO THE CUTLER-HAMMER MFG. CO., OF MILWAUKEE, WISCONSIN, A CORPORATION OF WISCONSIN.

SYSTEM OF ELECTRICAL TRANSMISSION AND DISTRIBUTION.

1,364,129.  Specification of Letters Patent.  Patented Jan. 4, 1921.

Application filed March 29, 1918. Serial No. 225,399.

*To all whom it may concern:*

Be it known that I, FRIEDRICH W. MEYER, a citizen of the German Empire, residing at Milwaukee, in the county of Milwaukee and State of Wisconsin, have invented new and useful Improvements in Systems of Electrical Transmission and Distribution, of which the following is a full, clear, concise, and exact description, reference being had to the accompanying drawing, forming a part of this specification.

This invention relates to systems of electrical power transmission and distribution and more particularly to high tension systems wherein the power is to be transmitted in the form of direct current.

Transmission of electrical power in the form of direct current rather than in the form of alternating current is expedient in all high tension systems and especially in systems of series connected transmitting and distributing stations. On the other hand, transmission of power in the form of direct current has heretofore presented numerous difficulties. Direct current generators cannot be designed for very high voltages and series connection of such generators for furnishing a high potential is undesirable because the various generators must be insulated from their prime movers and from ground. And if in a series system direct current motors are required at the distributing stations, as in the past, they must be operated at a fixed current with variable voltage and since such motors cannot be designed for very high voltages they are limited in their output capacity thus rendering such a system of very limited flexibility.

The present invention has among its objects to overcome such handicaps of direct current power transmission in the aforesaid and other systems of power transmission and distribution and to coördinate the generator and motor stations for varying conditions of power generation and consumption by electroionic means.

A further object is to enable operation of nating current generators and motors in a direct current system of power transmission and distribution and to provide therefor by employment of electroionic means.

A further object is to enable use of alternating current generators and motors in a direct current system of power transmission and distribution and to provide therefor by employment of electroionic means.

Other objects and advantages of the invention will hereinafter appear.

The accompanying drawing illustrates certain systems of power transmission and distribution embodying the present invention together with various possible modifications of the stations thereof and said drawing will now be described, it being understood that the invention is susceptible of further modifications.

In the drawing,

Figure 1 shows a series system;

Figs. 2, 3 and 4 show modifications of the receiving stations shown in Fig. 1;

Fig. 6 shows a parallel system.

Figure 5:
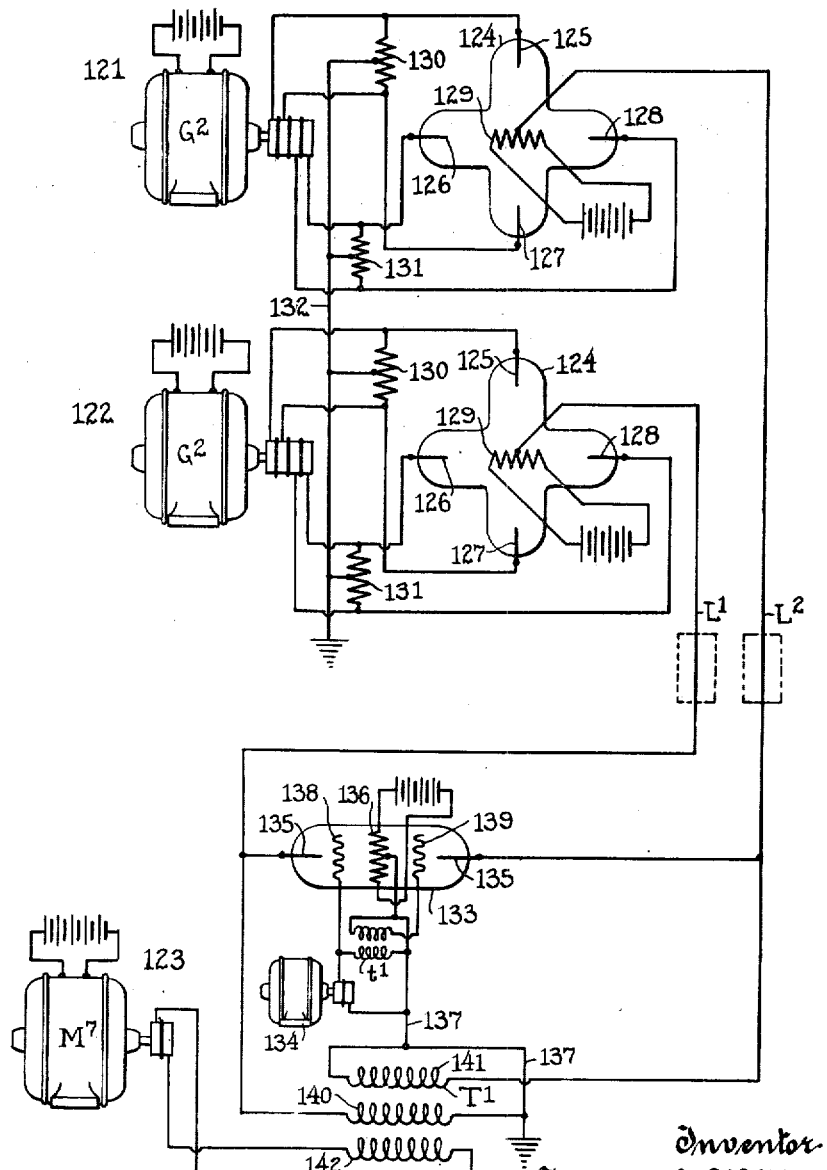
Fig. 5 shows a series-parallel system.

Referring to Fig. 1, the system shown therein includes two generator or sending stations 1 and 2 and three motor or receiving stations 3, 4 and 5, all of the same being series connected and each provided with electroionic control apparatus, *i. e.*, apparatus having a discharge either of electrons exclusively or of electrons and other ions.

The generating station 1 includes an alternating current generator G having a rotating field excited as by a battery 6 and an armature to supply alternating current to lines 7 and 8 which are connected through an impedance 9 and conductor 10 to ground and through an electroionic rectifying device 11 to a direct current transmission line L. However, if preferred a transformer might be interposed between the generator and the electroionic device in lieu of the impedance. The electroionic device is provided with anodes 12 and 13 to be connected to the impedance or transformer, as the case may be, a common cathode 14, heated as by current from a battery 15, and auxiliary anodes or grids 16 and 17 for regulating the rectified current which is passed between said anodes and cathode. The grids 16 and 17 are both connected by conductor 18 through a battery 19 and a resistance $r$ in the transmission line L to the cathode 14 and the arrangement is such that the drop in potential through the resistance $r$ opposes the voltage of battery 19 for automatic regulation of the voltage between the grids and the cathode to maintain the current supplied to line L at a constant value.

Thus such a station provides for a high voltage output by a single machine and control of such machine for constant current in an exceedingly simple and efficient manner.

The generating station 2 includes a similar generator $G^1$ supplying current to lines 20 and 21, said lines being connected through an impedance 22 which has its neutral point connected to the section of line L leading from station 1 and its terminals connected through an electroionic rectifying device 23 to a second section of the transmission line L. The device 23 is provided with anodes 24 and 25 for connection as in the former instance and a common cathode 26, heated as by current from a battery, said cathode being connected to said second section of line L through a resistance $r$. Thus the electroionic device 23 merely serves as a rectifier, the control of the current in this instance being accomplished through regulation of the field excitation of the generator by an electroionic device 27. The field of the generator, as in the previous instance, is supplied by a battery 28 and the electroionic device 27 is connected in series between the battery and the generator field, said device having a heated cathode 29 connected to said battery, an anode 30 connected to one of the slip rings of the generator and an auxiliary anode or grid 31. The grid 31 is connected through a battery 32 to the transmission line L at a point between the electroionic device 23 and resistance $r$, while the cathode 29 is connected by conductor 33 to the transmission line L on the opposite side of resistance $r$. Thus the amount of exciting current in the field circuit of the generator is dependent upon the action of electroionic device 27 which is regulable by the grid 31. And the arrangement is such that the drop across resistance $r$ will control the potential supplied to the grid and hence will control the field excitation of the generator to maintain the current passing the rectifying device 23 at a constant value. It is to be understood, however, that the provision of regulating means at each station is not always necessary.

The receiving station 3 includes an A. C. motor M of the synchronous type, having a rotating field supplied by battery 34 and having armature windings 35 and 36 to be supplied with intermittent pulsatory currents as hereinafter described, to produce component intermittent pulsatory magnetomotive forces and a resultant alternating magnetic flux. The windings 35 and 36 are arranged to be supplied with current from the transmission line L under the control of an electroionic device 37 and to be so traversed by such current as to render the same of opposite polarities. The electroionic device has four anodes 38, 39, 40 and 41, a common cathode 42 and grids 43, 44, 45 and 46 each interposed between one of said anodes and said cathode. The anodes 38 and 40 are respectively connected to the motor windings 35 and 36 and through said windings to the section of line L leading from station 2 while anodes 39 and 41 are connected to said line either directly or through batteries as hereinafter described. And the cathode 42 is supplied with a heating current by a battery 47 and is connected to a third section of line L. Thus the arrangement is such that all current supplied over line L must pass through the electroionic device 37 between one or the other anodes thereof and the cathode and such that all current passing between anode 38 and the cathode is forced to traverse the motor winding 35, while all current passing between anode 40 and the cathode is forced to traverse the motor winding 36. Further, the electroionic device is designed to be dependent upon given potentials of the grids thereof to pass current between the two sections of the transmission line connected therewith, such grid potentials to be supplied by a small alternating current generator 48. And this generator is arranged to supply positive potential half waves to the grids sequentially with a phase displacement of 90° between the potential waves impressed upon successive grids. To this end the generator 48 is provided with a plurality of half insulated slip rings 49, 50, 51 and 52, each connected to one of the grids and a non-insulated slip ring 53 connected to the cathode 42, said insulated rings being arranged in relation to effect the desired displacement of the potentials supplied thereby. Accordingly the electroionic device will pass current between the two sections of the transmission line in pulses of 90° displacement and will force pulses of 180° displacement through the armature windings of the motor, each winding being limited to alternate pulses whereby they will produce an alternating magnetic flux for operation of said motor. Or the windings 35 and 36 may be utilized as the primary windings of a transformer to induce an alternating current in a secondary winding supplying the motor armature. On the other hand, the pulses of current passed between the anodes 39—41 and the cathode are in this instance utilized only to insure a continuous current in the transmission line and it is therefore desirable to reduce the potential of such pulses by an amount corresponding to the drop in potential across the motor windings. And this may be readily accomplished by including in series with the anodes 39 and 41 batteries 55 and 56 respectively to oppose the potentials impressed upon said anodes or in other ways, as by influencing the sensitive circuits. Also, it is desirable to provide for adjustment of the power factor of the motor and to this end an adjustable rheostat R is provided for varying the field excitation of the generator 48 to control the armature current of the motor. Thus since the frequency of the current supplied through the electroionic device may be varied by variation of the speed of the generator while the generator may be designed and controlled to give any desired wave form, the advantages of this form of control apparatus will be apparent. And as will hereinafter appear, provisions may be readily made for automaticaly stabilizing the operation of the motor when subjected to widely varying loads.

The receiving station 4 includes two direct current motors $M^1$ and $M^2$ each having its armature connected in parallel to one of a plurality of electroionic devices 60 connected in parallel in the series transmission line L. Each device 60 has an anode 61 connected to one section of line L, a heated cathode 62 connected to another section of line L and a grid 63, while each motor has its armature terminals respectively connected to the anode and cathode of its corresponding electroionic device. And each motor has connected thereto to be driven thereby a tachometer 64 which is connected between the grid and cathode of the corresponding electroionic device through a battery 65. Thus the amount of current delivered to the armature of each motor will be determined by the grid potential of the corresponding electroionic device and as will be apparent, the tachometer driven by each motor provides for automatic variation of the grid potential of the corresponding electroionic device for automatic control of its respective motor. On the other hand, each motor may be provided with any desired field regulating means, such as the conventional means illustrated, whereby it may be controlled at will.

The receiving station 5 includes a direct current motor $M^3$ having its armature and field in series in the transmission line but having its field shunted by one or a battery of electroionic devices 70. Each device 70 has an anode 72, a heated cathode 73 and an auxiliary anode or grid 74. The anodes of the devices are connected in parallel to a point between the armature and field of the motor while the cathodes are connected in parallel to the opposite side of the field which is connected to ground. And the motor is provided with a tachometer 75 which has one side of its armature connected through a battery 76 to the grids in parallel and its other side connected to the cathodes in parallel, the tachometer and battery providing opposing potentials for the grid-cathode circuits. Thus the amount of current supplied to the field of the motor will be dependent upon the discharge of the electroionic devices and the tachometer will function upon variations in the speed of the motor to influence such discharge to effect constant speed control of said motor. Also, a rheostat $R^1$ is included in series with the field of the motor to provide for independent variation of the excitation thereof.

Thus the electroionically controlled system provides for the use of high potential alternating current generators, the potentials of which may even be stepped up by transformer action if desired, and further provides for rectification of such potentials and regulation thereof for constant current in the series line. Also, the system provides for use of either direct current or alternating current receiving motors, for re-conversion of the direct current of the transmission line into alternating current of any desired frequency and for either straight series or partial parallel connection of the receiving motors. Hence either the current or potential or both the current and potential supplied to the individual motors may be varied to suit operating conditions.

Referring to Fig. 2, the same shows a modification of the control station 3. In this instance the current transmitted over line L is passed through an electroionic device 80 and through the primary coils of a transformer T under the control of said device. The transformer has four primary coils 81, 82, 83 and 84 to induce a two phase alternating current in the secondary of said transformer which comprises star connected coils 85, 86, 87 and 88 supplying the rotor of a two phase alternating current motor $M^4$. The electroionic device, as in station 3, is provided with four anodes 89, 90, 91 and 92, a common heated cathode 93 and auxiliary anodes or grids 94, 95, 96 and 97. The anodes 89, 90, 91 and 92 are respectively connected through transformer coils 81, 82, 83 and 84 to one section of the transmission line L and the cathode 93 is connected to another section of said line, while the grids are subjected to potential by a small alternating current generator 98 similar to that used in station 3. This generator has a continuous slip ring 99 connected to the cathode 93 and half insulated slip rings 100, 101, 102 and 103 adapted to be respectively connected to the grids 94, 95, 96 and 97, as exemplified by the connections of grid 97 and ring 103. And as in the previous instance, the slip ring arrangement is such that the generator will subject the grids successively to potential half waves displaced by 90° whereby the electroionic device will function to pass current through the transformer coils 81 to 84 in progression with the result of inducing a two phase alternating current in the secondary coils for operation of motor $M^4$. At the same time the device will pass a continuous current between the sections of the transmission line with very little oscillation which may be rendered negligible by a transformer $t$. Transformer $t$ has a primary coil included in series in the traismission line and a secondary coil in each of the grid circuits of the electroionic device, only one of said coils being shown. Thus the transformer will subject the sensitive circuits of the electroionic device to the influence of any oscillations in the transmission line and said device may be made sensitive to such influence to minimize such oscillations.

Referring to Fig. 3, the same shows a modification of station 5, wherein a D. C. series motor $M^5$ is connected to the series transmission line with its armature and field both connected in parallel with an electroionic device 110. The device 110 is provided with an anode 111 connected to one section of the transmission line L and to one terminal of the field of motor $M^5$ and is also provided with a cathode 112 connected to another section of the transmission line and to one terminal of the motor armature. Thus the amount of current supplied to the motor 5 will be dependent upon the discharge of device 111, which in this instance is controlled by a tachometer 113 driven by the motor and supplying current to the cathode 112 to heat the latter and to a degree dependent upon the speed of said motor. Accordingly the means described may be utilized to regulate the motor for constant speed or the same may be utilized to regulate the motor for different speed characteristics under varying load conditions. For example, the tachometer may be subjected to the influence of current variations in the motor circuit, as by an auxiliary field connected in said circuit, as shown. Also, said means may be employed for control of the motor at will, as by regulation of the field of the tachometer by the conventional means illustrated.

Referring to Fig. 4, the same shows a further modification of station 5 wherein a D. C. motor $M^6$ has its armature in series in the transmission line and has its field separately excited by a battery 114 and tachometer 115, the exciting current being passed through an electroionic device 116. The device 116 has an anode 117 connected to one terminal of the motor field through battery 114, a heated cathode 118 connected to the other terminal of the motor field through the tachometer, and a grid 119 supplied with potential by the tachometer which is opposed by the potential of a battery 120. The arrangement is such that the electroionic device will upon variation in the speed of the tachometer, due to the variations in the speed of the motor, vary the field excitation of the motor to correct such speed variations.

Referring to Fig. 5, the same shows a combined series and parallel system wherein generating stations 121 and 122 are provided to supply direct current to two separate transmission lines $L^1$ and $L^2$ which may be used to individually supply any number of stations such as those above described and then to jointly supply an alternating current motor station 123. The generating stations each comprise a two phase alternating current generator $G^2$ and an electroionic rectifying device 124, said device having anodes 125, 126, 127 and 128 and a heated cathode 129. The anodes 125 and 127 are respectively connected to opposite terminals of an impedance 130 connected across one phase of the generator circuit and anodes 126 and 128 are connected to opposite terminals of an impedance 131 connected across the second phase of the generator circuit, while the neutral points of both of said impedances are grounded by a conductor 132. On the other hand, the electroionic devices of the two stations have their cathodes respectively connected to transmission lines $L^1$ and $L^2$ and hence each station supplies to its respective transmission line a rectified current. And as will be apparent, the use of two phase generators provides for greater uniformity of the rectified currents.

The motor station comprises a single phase alternating current motor $M^7$ and means including an electroionic device 133, a small alternating current generator 134 and a transformer $T^1$ for producing a single phase alternating current for said motor from the current supplied by the transmission lines $L^1$ and $L^2$. The electroionic device 133 has two anodes 135 respectively connected to transmission lines $L^1$ and $L^2$, a heated cathode 136 connected by conductor 137 to ground and two grids 138 and 139 adapted to be alternately supplied with positive potential waves by the generator 134. The generator has its slip rings directly connected to the anode 138 and the cathode and supplies potential to the cathode and anode 139 through a transformer $t^1$ for 180° phase displacement of the potentials of the two grids. Thus the electroionic device provides for grounding line $L^1$, when the generator impresses a positive potential upon grid 138 and for grounding line $L^2$ when said generator impresses a positive potential upon grid 139, while the transformer $T^1$ is arranged to receive current from lines $L^1$ and $L^2$ when not so grounded. More specifically, the transformer has a primary coil 140 connected between line $L^1$ and ground to parallel one-half of the electroionic device and has a primary coil 141 connected between line $L^2$ and ground to parallel the other half of said electroionic device. In consequence, current will be supplied to said windings alternately and said windings are so arranged that current will traverse the same in relatively opposite directions whereby they will produce component magnetomotive forces and a resultant alternating magnetic flux. And such alternating magnetic flux will induce an alternating current in the secondary winding 142 of the transformer which is connected to supply the rotor of motor $M^7$.

Referring to Fig. 6, the same shows a parallel system including a generator station 145 and motor stations 146 and 147.

The generator station 145 is identical with station 1 of Fig. 1, except for changes in the sensitive circuits of the electroionic rectifying device and said station is employed to supply a parallel circuit $L^3$, $L^4$. In this instance, the cathode of the electroionic rectifying device is connected to line $L^3$ and the grids are connected through a battery 148 to the same line for regulation of the discharge of said device to maintain a constant potential of the transmission circuit. More specifically, the arrangement is such that a drop in the potential of the transmission line will result in an increased potential of the grids and hence an increase in the discharge of the vessel, while a rise in the line potential will have the opposite effect.

The motor station 146 includes an alternating current motor $M^8$ and reconverting means including electroionic devices 150 and 151, an alternating current generator 152 and a transformer $T^2$. The electroionic devices are provided to respectively pass current through the primary windings 153 and 154 of the transformer $T^2$ which has a secondary winding 155 supplying current to the stator of motor $M^8$. And said devices are arranged to pass current to said primary transformer windings alternately and in relatively reverse directions as in the case of the apparatus shown in Fig. 5. To this end each electroionic device is provided with an anode 156 connected to line $L^4$, a heated cathode 157 connected through its respective transformer winding to line $L^3$ and a grid 158 adapted to be subjected to a potential by the generator 152 which in this instance is provided with two sets of slip rings each set to supply potential to the grid cathode circuit of one of the electroionic devices and to displace such potentials by 180°. It will thus be seen that the electroionic devices will discharge alternately and that said devices will function as already described to supply the motor $M^8$ with a single phase alternating current. Also, it will be observed that in this instance, as in the case of the motor station 3 of Fig. 1, it may be desirable to provide for stabilizing the operation of the motor $M^8$. To this end a transformer $t^3$ is arranged with its primary winding connected in the stator circuit of the motor in parallel to a resistance $r$ and with secondary windings connected in the sensitive circuits of the electroionic device. Thus the sensitive circuits of the electroionic device will be subjected to the influence of variations in the load on the motor, thereby rendering said device operative to automatically meet the varying demands of the motor under varying load conditions.

Station 147 includes a similar motor $M^9$ and reconverting means including an electroionic device 160, a small alternating current generator 161 and a transformer $T^3$. The transformer $T^3$ is identical with the transformer of station 146 and the electroionic device 160 is structurally the same as that employed in station 123 of Fig. 5, and supplies current to the secondary of the transformer similarly to the two electroionic devices of station 146. In this instance, however, the small alternating current generator 161 supplies potential to the grids through a transformer $t^4$ which has two secondary coils each to supply one grid circuit and to supply potential waves which at each instant are opposed to the potential waves supplied by the other with the result that the two grids are supplied with positive potential waves alternately. And in this instance batteries 163 and 164 are provided in the grid circuits to neutralize the negative potential waves impressed upon the grid circuits to prevent either grid from influencing the discharge controlled by the other grid. Thus, except for the aforesaid modifications, the electroionic reconverting apparatus of station 147 is like that of station 146 and affords the same control of the motor. However, the stabilizing means of station 147 is quite different from that of station 146. In this instance provisions are made for stabilizing the operation of the motor through influences on the field of the motor. The motor field is provided with auxiliary slip rings 165 and 166 which are subjected to a potential controllable by an electroionic device 167. This device is like the device 160, and has its anodes connected to the terminals of an impedance 168 connected across the motor armature circuit while its heated cathode is connected to auxiliary slip ring 166 of the motor, the other auxiliary slip ring being directly connected to the neutral point of said impedance. Further, the device has its grids supplied with potential by a transformer $t^5$ which is similar in construction and function to the transformer $t^4$ and which has its primary winding connected in series in the armature circuit of the motor. Thus the electroionic device serves as a double wave rectifier and as a relay to subject the auxiliary slip ring circuit of the motor to a variable potential determined by the phase displacement between the current and voltage of the motor armature circuit thereby providing for stabilization of the operation of the motor under varying load conditions.

What I claim as new and desire to secure by Letters Patent is:

1. In a system of high voltage direct current transmission and distribution, in combination, generator and motor stations, and electroionic discharge apparatus for coördinating said stations for varying conditions of power generation and consumption, said apparatus being associated with said stations whereby the electrical discharge thereof is directly influenced by such varying conditions of power generation and consumption.

2. In a system of electrical power transmission and distribution, in combination, alternating current generator and motor stations, electroionic power rectifying means associated with the former and electroionic power reconverting frequency determining means associated with the latter.

3. In a system of electrical power transmission and distribution, in combination, alternating current generator and motor stations, electroionic means associated with the former for rectifying and regulating the energy supplied thereby and electroionic means associated with the latter of said stations for re-conversion and cycle determination of the supplied energy.

4. In a system of electrical power transmission and distribution, in combination, series connected alternating current generator and motor stations, electroionic rectifying and current regulating means associated with the former and electroionic reconverting and cycle determining means associated with the latter of said stations.

5. In a system of electrical power transmission and distribution, in combination, a generator station, alternating current and direct current motor stations and electroionic means coördinating said stations for varying conditions of power generation and consumption.

6. In a system of electrical power transmission and distribution, in combination, an alternating current generator station, alternating current and direct current motor stations, and electroionic means coördinating said stations for varying conditions of power generation and consumption, said means including rectifying means associated with said generator station and reconverting means associated with the first mentioned of said motor stations.

7. In a system of electrical power transmission and distribution, in combination, a generator station, alternating current and direct current motor stations and electroionic means coördinating said stations for series connection.

8. In a system of electrical power transmission and distribution, a generator station, alternating current and direct current motor stations and electroionic means coördinating said stations for series connection and for transmission of power therebetween in the form of direct current.

9. In a system of electrical transmission and distribution, in combination, a generator station, a plurality of motors and electroionic means for coördinating said generator station and motors for series connection of said motors with said generator and for parallel connection of certain of said motors.

10. In a system of electrical power transmission and distribution, in combination, an alternating current generator station, motor stations and electroionic means associated with said generator station to rectify and regulate the power supplied thereby to said motor stations.

11. In a system of electrical power transmission and distribution, in combination, an alternating current generator station and series connected motor stations supplied thereby and electroionic means associated with said generator station to rectify the current supplied thereby and to control such current for a substantially constant value thereof.

12. In a system of electrical power transmission and distribution, in combination, series connected alternating current generator stations, motor stations supplied thereby in series and electroionic means associated with each of said generator stations to rectify the current supplied thereby and to control such current.

13. In combination, an alternating current generator, a circuit to be supplied thereby, and electroionic means to rectify and regulate the power supplied to said circuit by said generator.

14. The combination with an alternating current generator, of a circuit to be supplied thereby and electroionic means to rectify the current supplied by said generator to said circuit and to control said circuit for a substantially constant current.

In witness whereof I have hereunto subscribed my name.

FRIEDRICH W. MEYER.

It is hereby certified that in Letters Patent No. 1,364,129, granted January 4, 1921, upon the application of Friedrich W. Meyer, of Milwaukee, Wisconsin, for an improvement in "Systems of Electrical Transmission and Distribution," errors appear in the printed specification requiring correction as follows: Page 1, line 47, for the word "operation" read *use;* line 48, for the syllables "nating" read *alternating;* line 52, for the words and syllables "use of alter-" read *operation of;* and that the said Letters Patent should be read with these corrections therein that the same may conform to the record of the case in the Patent Office.

Signed and sealed this 25th day of January, A. D., 1921.

[SEAL.]

L. B. MANN,
*Acting Commissioner of Patents.*

Cl. 171—97.